US012812280B2

(12) United States Patent
Sung et al.

(10) Patent No.: US 12,812,280 B2
(45) Date of Patent: Nov. 24, 2026

(54) DYNAMIC MICROPHONE CAPSULE SUSPENSION STRUCTURE

(71) Applicant: Logitech Europe S.A., Lausanne (CH)

(72) Inventors: Tzyy-Woei R. Sung, Los Angeles, CA (US); Clayton Christopher Williamson, Moorpark, CA (US); Adam Kirk Bennett, Ventura, CA (US); Aron Michael Rosenberg, Lafayette, CA (US)

(73) Assignee: LOGITECH EUROPE S.A., Lausanne (CH)

(*) Notice: Subject to any disclaimer, the term of this patent is extended or adjusted under 35 U.S.C. 154(b) by 483 days.

(21) Appl. No.: 18/241,222

(22) Filed: Aug. 31, 2023

(65) Prior Publication Data

US 2025/0080891 A1 Mar. 6, 2025

(51) Int. Cl.
*H04R 1/08* (2006.01)
*H04R 1/02* (2006.01)

(52) U.S. Cl.
CPC ............... *H04R 1/08* (2013.01); *H04R 1/026* (2013.01); *H04R 2201/025* (2013.01); *H04R 2201/401* (2013.01); *H04R 2420/09* (2013.01)

(58) Field of Classification Search
CPC . H04R 1/08; H04R 19/04; H04R 1/04; H04R 1/2892; H04R 1/222; H04R 1/02; H04R 1/026; H04R 19/016; H04R 2201/02; H04R 2201/025; H04R 2201/401; H04R 2420/09
USPC ........ 381/91, 174, 361, 355, 122, 71.7, 369, 381/26, 336, 345
See application file for complete search history.

(56) References Cited

U.S. PATENT DOCUMENTS

| | | | | |
|---|---|---|---|---|
| 5,033,093 | A * | 7/1991 | Tardo | H04R 7/10 381/163 |
| 2012/0140972 | A1* | 6/2012 | Akino | H04R 3/04 381/355 |
| 2014/0153739 | A1* | 6/2014 | Wiederholt | H04R 1/02 381/91 |
| 2015/0210224 | A1* | 7/2015 | Barna | H04R 1/04 381/365 |
| 2020/0337186 | A1* | 10/2020 | Eveleigh | G10K 11/002 |
| 2024/0281078 | A1* | 8/2024 | Akkil | G06F 3/0346 |

* cited by examiner

*Primary Examiner* — Norman Yu
(74) *Attorney, Agent, or Firm* — Patterson + Sheridan, LLP

(57) ABSTRACT

Embodiments of the disclosure include a dynamic microphone capsule suspension assembly. The microphone capsule suspension assembly includes a body comprising: an inner surface and an outer surface, wherein the inner surface defines an internal region that is configured to support a microphone; an upper extension extending from the outer surface in a radial direction that extends from a central axis of the body; and a lower extension extending from the outer surface in the radial direction. The upper extension and lower extension are spaced apart in a direction that is parallel to the central axis, and each comprise a wall that has a first wall thickness and comprises an array of indentations that have a second wall thickness formed therein. The first wall thickness is greater than the second wall thickness.

21 Claims, 8 Drawing Sheets

DYNAMIC MICROPHONE CAPSULE SUSPENSION STRUCTURE

BACKGROUND

Field

Embodiments of the present disclosure generally relate to a microphone assembly and a microphone system.

Description of the Related Art

Dynamic microphones are commonly used for converting sound waves into electrical signals. They feature a diaphragm that vibrates in response to sound waves, which causes a coil of wire within a magnetic field to generate an electrical current proportional to the sound waves.

Dynamic microphones offer advantages such as durability, ruggedness, affordability, and a wide frequency response, making them well-suited for live performances. However, they are less sensitive when compared to condenser microphones requiring high gain, low noise circuitry to yield a high quality signal. When sound waves hit the diaphragm of a dynamic microphone capsule, vibrations are generated. Without proper isolation, vibrations can also be introduced via external structure-borne motion, such as when handling, moving, or adjusting the device.

To address the challenge of unwanted noise resulting from structure-borne vibrations, dynamic microphones can incorporate suspensions, also known as shock mounts or shock absorbers. These suspensions, or vibration isolators, typically made of rubber or foam, are positioned between the microphone and body, or between the microphone and its stand. Their primary purpose is to isolate the microphone from structure-borne vibrations introduced directly to the microphone body or from the external environment, ensuring a clean audio signal.

However, there are certain areas where current suspensions in dynamic microphones can be improved. Conventional rubber suspensions, while only somewhat effective at isolating vibrations, can be bulky and add weight to the microphone and generally have little damping. This can pose challenges in certain microphone assembly settings where space is limited and weight is a concern. Foam suspensions, on the other hand, offer a lighter alternative but are less effective at isolating vibrations, potentially leading to unwanted noise in the audio signal. External shock mounts can be bulky and costly.

Accordingly, there is a need for an improved suspension apparatus that includes effective vibration isolation, reduced bulkiness, and reduced weight to solve the problems described above.

SUMMARY

Embodiments of the disclosure provided herein include microphone capsule suspension assembly, comprising a body. The body will include: an inner surface and an outer surface, wherein the inner surface defines an internal region that is configured to support a microphone capsule; an upper extension extending from the outer surface in a radial direction that extends from a central axis of the body; and a lower extension extending from the outer surface in the radial direction. The upper extension and lower extension are spaced apart in a direction that is parallel to the central axis. The upper extension and lower extension each comprise a wall that has a first wall thickness and comprises an array of indentations that have a second wall thickness formed therein, and the first wall thickness is greater than the second wall thickness.

Embodiments of the disclosure may further provide a microphone assembly that includes a microphone body assembly, a microphone capsule suspension assembly configured to be coupled to the microphone body assembly by a clamp assembly, and a dynamic microphone capsule disposed within the internal region of the body. The microphone capsule suspension assembly may include: a body comprising: an inner surface and an outer surface, wherein the inner surface defines an internal region that is configured to support a microphone capsule; an upper extension extending from the outer surface in a radial direction that extends from a central axis of the body; and a lower extension extending from the outer surface in the radial direction. The upper extension and lower extension are spaced apart in a direction that is parallel to the central axis. The upper extension and lower extension each comprise a wall that has a first wall thickness and comprises an array of indentations that have a second wall thickness formed therein, and the first wall thickness is greater than the second wall thickness.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
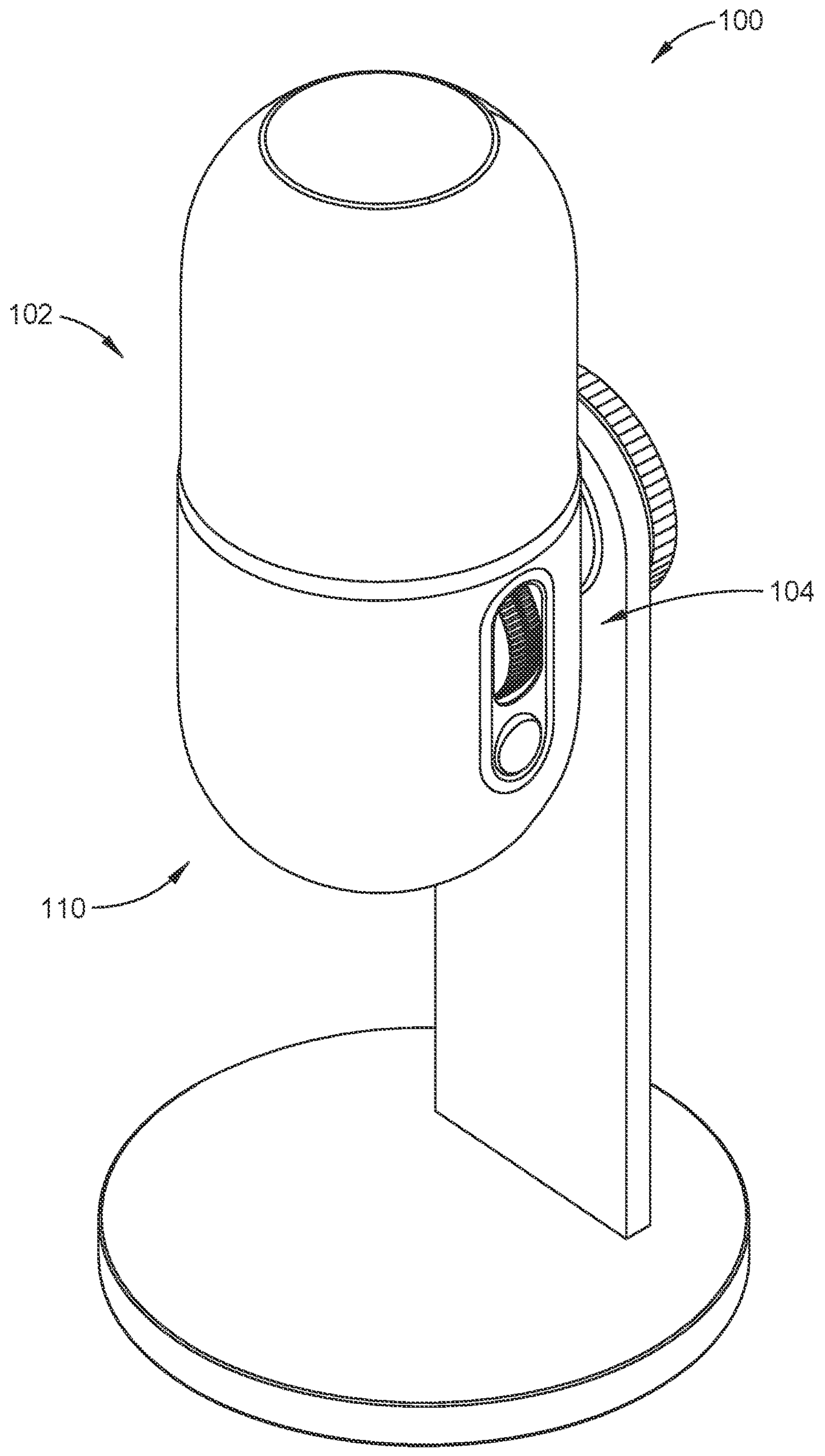
FIG. 1A is an isometric view of a microphone assembly, according to certain embodiments.

Embodiments herein are generally directed to a microphone assembly and a microphone system that is configured to support dynamic microphone capsules during use. More particularly, systems that include improved dynamic microphone capsule support structures, which include a microphone capsule suspension assembly.

Dynamic microphone capsules are widely employed for converting sound waves into electrical signals, with a structure akin to loudspeakers, but serving the opposite function. They offer advantages such as durability, ruggedness, affordability, and a wide frequency response, making them ideal for live performances. However, compared to condenser microphone capsule, dynamic microphones exhibit lower sensitivity requiring high gain, low noise circuitry to yield a high quality signal.

During operation, when sound waves hit the diaphragm of a dynamic microphone capsule, vibrations in the diaphragm and supporting structure are often generated, which, if not properly isolated, can introduce noise into the signal generated by the dynamic microphone capsule. To address the challenge of unwanted noise caused by vibrations, supporting structures that include suspensions or vibration isolators, also known as shock mounts or shock absorbers, are integrated into dynamic microphones. These suspensions are placed between the voice coil based dynamic microphone capsule and body of the microphone assembly, aiming to damp and/or isolate the dynamic microphone capsule from vibrations and ensure a clean audio signal.

The suspension acts as a shock absorber, absorbing vibrations and preventing their transmission to the diaphragm of the voice coil based microphone capsule. This effectively enhances sound quality by reducing unwanted noise in the transmitted signal provided to a microphone signal receiving electrical component, such as equipment used in live and recorded audio engineering equipment, sound recording equipment, two-way radios, megaphones, radio and television broadcasting equipment, live streaming audio and/or video equipment, and other similar useful devices.

However, current external suspensions, though effective in isolating vibrations, can be bulky and are not designed or engineered to avoid the effects of resonant frequencies created by the structural design of the microphone assembly, which will lead to distortion in the detectable sounds at one or more frequencies within the audible range detected by the microphone assembly. Further, the often unwanted resonant frequencies disposed within an audible range of a human's hearing, will produce undesirable frequency responses and noticeable distortion in the generated signals produced by the microphone assembly. In general, resonant frequencies of a simple mechanical structure can be determined by:

$$f = \frac{1}{2\pi}\sqrt{\frac{k}{m}}, \qquad \text{(Equation 1)}$$

where k is the spring constant (e.g., stiffness of the supporting system) and m is the mass of the vibrating portion of the supporting system, such as the dynamic microphone and a portion of its supporting structure. This is known as the suspended resonance frequency. Frequencies greater than this suspended resonance frequency are known as the mass controlled region, and are characterized by a high degree of isolation between the capsule and supporting structure. In contrast, frequencies lower than the suspended resonance are known as the stiffness controlled region, and are characterized by a low degree of isolation between the capsule and supporting structure. Since the mass (m) of the a dynamic microphone is typically larger than a condenser microphone, the resonant frequencies of most dynamic microphone containing systems will be in the lower in the audible frequency range versus a condenser microphone type of assembly, due to the smaller mass of the diaphragm coupled components in the condenser microphone designs.

In an effort to maximize the effectiveness of vibration isolation, an important design aspect is to provide the lowest possible suspended resonance, which results in low stiffness and high mass. Since the mass is largely fixed by the design of the capsule, it is necessary to design the suspension stiffness to be as low as possible. The design must offer low stiffness axially, but high stiffness laterally. This is needed to allow good isolation in the direction of diaphragm motion, where the capsule is extremely sensitive to motion, while preventing tilting, rocking, or other unstable motion that might cause collisions with nearby internal structures.

In some embodiments of the disclosure herein, it is desirable to design the suspension structure so that any developed suspended resonant frequencies are less than 100 hertz (Hz), since the audible range of most human voices is greater than 100 Hz. In one example, the suspension structure is designed so that it has a desirable structural shape, as disclosed herein, and is formed from a material that it adapted to damp all resonant frequencies that are greater than 100 Hz, or all resonant frequencies that are greater than 80 Hz, or all resonant frequencies that are greater than 40 Hz, even all resonant frequencies that are greater than 20 Hz. In some embodiments, the suspension structure disclosed herein that is less stiff than conventional dynamic microphone designs and utilizes materials that have higher damping coefficients so that the suspended resonance of the capsule is lower than operating frequency range of the microphone, and a better sound quality can be provided as a signal output by the microphone assembly.

To address these issues, the present disclosure provides a support structure for a dynamic microphone capsule that includes a suspension mounted to a clamp assembly that is used to retain the suspension and facilitate the physical isolation between various regions of the microphone assembly from each other. By surrounding the dynamic microphone capsule with the suspension and isolating the dynamic microphone capsule from other components of the microphone, unwanted vibrations are dampened by the suspension before they are processed by the dynamic microphone capsule, thus reducing noise. This suspension is characterized by low axial stiffness, high lateral stiffness, and built-in shock absorbers to prevent collisions in the case of very large lateral loads.

FIG. 1A shows a perspective view of a microphone assembly 100. The microphone assembly includes a microphone housing 102 removably coupled to a stand 104. The microphone housing 102 is configured to house microphone components (not shown), such as a microphone mount assembly (not shown) and a suspension, which is also referred to herein as a microphone capsule suspension assembly (not shown). In some embodiments, the microphone housing 102 includes a grill 106 supporting a windscreen 108. The grill 106 is disposed over a voice coil (not shown) of a dynamic microphone capsule (not shown) disposed within the microphone housing 102 and is acoustically transparent, allowing acoustic waves to permeate the grill 106 and reach the diaphragm. The acoustic waves are then converted into electrical signals within the dynamic microphone capsule (e.g., item 130 in FIG. 1B). In one embodiment, the dynamic microphone capsule includes a front face 130A that is positioned parallel to a voice coil and perpendicular to the axis of motion of a voice coil or the deformation direction of the voice coil in response to a received audible input signal (e.g., sound generated from a source). The axis of motion of a voice coil (not shown) is generally parallel to the center axis 202 illustrated in FIG. 2A. In one configuration, the microphone assembly 100 is 62 millimeters (mm) in diameter, but other sizes can be used. In some embodiments, the microphone assembly 100 has a mass that is between about 210 grams (g) and about 220 g.

Figure 1B:
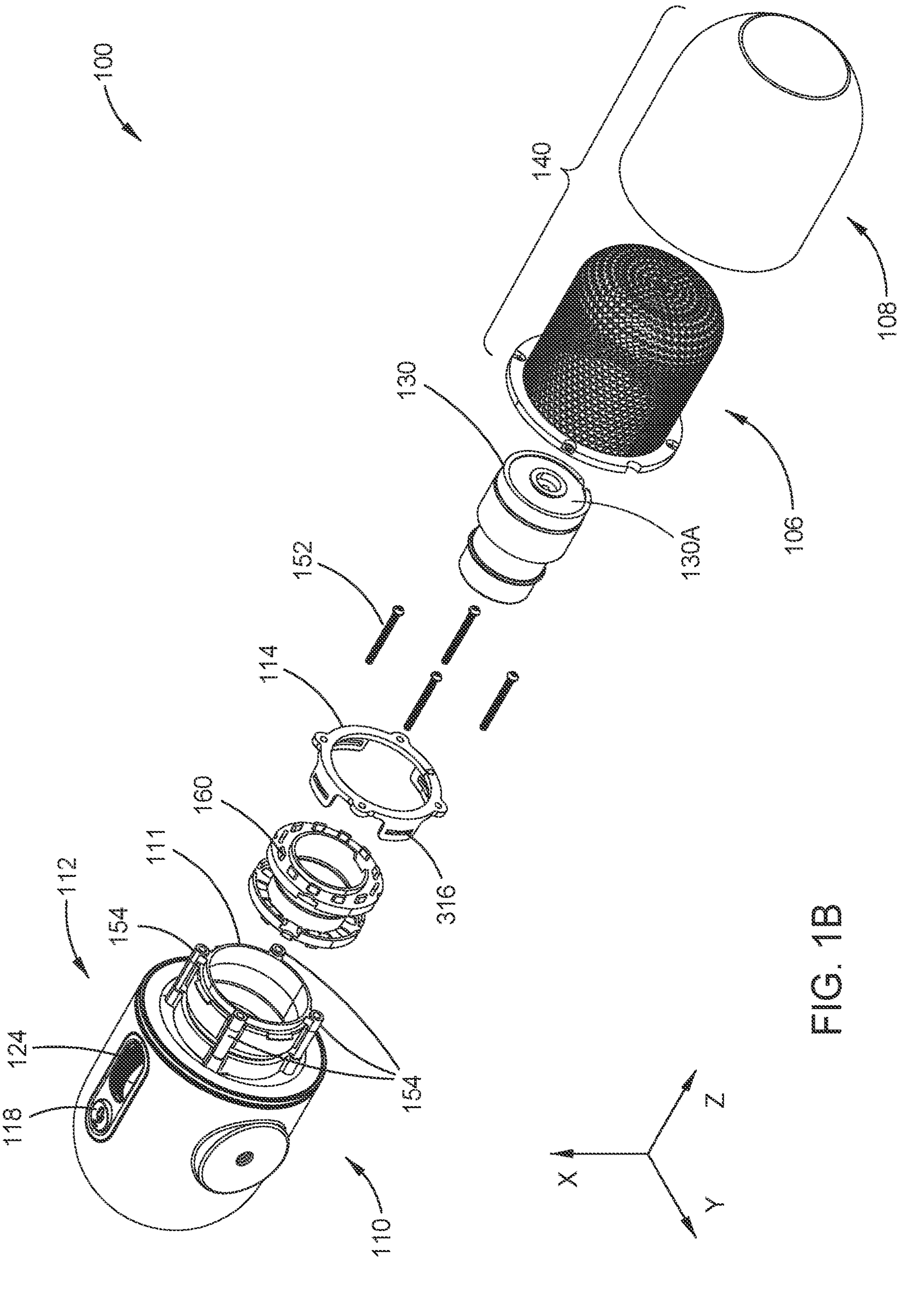
FIG. 1B is an exploded view of the microphone assembly of FIG. 1A, according to certain embodiments.

FIG. 1B illustrates an exploded view of a microphone assembly 100. The microphone assembly 100 includes a microphone body assembly 110, a dynamic microphone capsule 130, a cover 140, a suspension support 111, and a microphone capsule suspension assembly 160. The cover 140 is acoustically transparent such that audible signals that pass through the cover 140 maintain acoustic fidelity when they are received by the dynamic microphone capsule 130 disposed inside the cover 140. The microphone assembly 100 further includes a button 118 that allows a user to configure various features of the microphone assembly 100 system. The microphone assembly 100 may further include a scroll wheel 124 and a light source 126 (FIG. 1C) as part of the microphone body assembly 110. The scroll wheel 124 may optionally include an integrated button (not shown). In some embodiments, the cover 140 includes a grill 106 supporting a windscreen 108. The grill 106 is disposed over a voice coil (not shown) of a dynamic microphone 130 disposed within the microphone housing 102 and is acoustically transparent, allowing acoustic waves to permeate the grill 106 and reach the diaphragm. The acoustic waves are then converted into electrical signals within the dynamic microphone 130.

The microphone capsule suspension assembly 160 is coupled to a housing 112 of the microphone body assembly 110 using an upper clamp 114, a lower clamp 116, the mounting ring 150, and one or more fasteners 152 described further below in reference to FIG. 3. The dynamic microphone capsule 130, including a diaphragm (not shown), is disposed within the microphone capsule suspension assembly 160 such that the dynamic microphone capsule 130 only contacts the microphone capsule suspension assembly 160. In one embodiment, the dynamic microphone capsule 130 includes a front face 130A that is positioned parallel to a diaphragm, or membrane, and perpendicular to the axis of motion of a diaphragm or the deformation direction of the membrane in response to a received audible input signal (e.g., sound generated from a source). The axis of motion of a diaphragm (not shown) is generally parallel to the central axis 202 illustrated in FIG. 2A. In one configuration, the dynamic microphone capsule 130 is 14 millimeters (mm) in diameter, but other sizes can be used. In some embodiments, the dynamic microphone capsule 130 has a mass that is between about 20 grams (g) and about 24 g.

The microphone circuitry 122 may aid in converting acoustic waves received by the dynamic microphone capsule 130 into electrical signals which may then be sent to an external controller (not shown). Such signals may be a signal from the dynamic microphone capsule that includes information relating to sound detected over an audible range. In some embodiments, the audible range includes frequencies between about 20 Hz and 20,000 Hz, such as frequencies between about 80 Hz and 16,000 Hz.

This arrangement of the components within the microphone assembly 100 provides for improved damping as any unwanted vibration, such as vibrations caused from physical impact on the housing 112 of the microphone assembly 100, transmit through the microphone capsule suspension assembly 160 before reaching the dynamic microphone capsule 130. This allows the microphone capsule suspension assembly 160 to dampen the unwanted vibrations to prevent the dynamic microphone capsule 130 from registering the vibrations, and thus reduce the distortion and noise detected and provided in the output signal delivered from the microphone assembly 100.

Figure 1C:
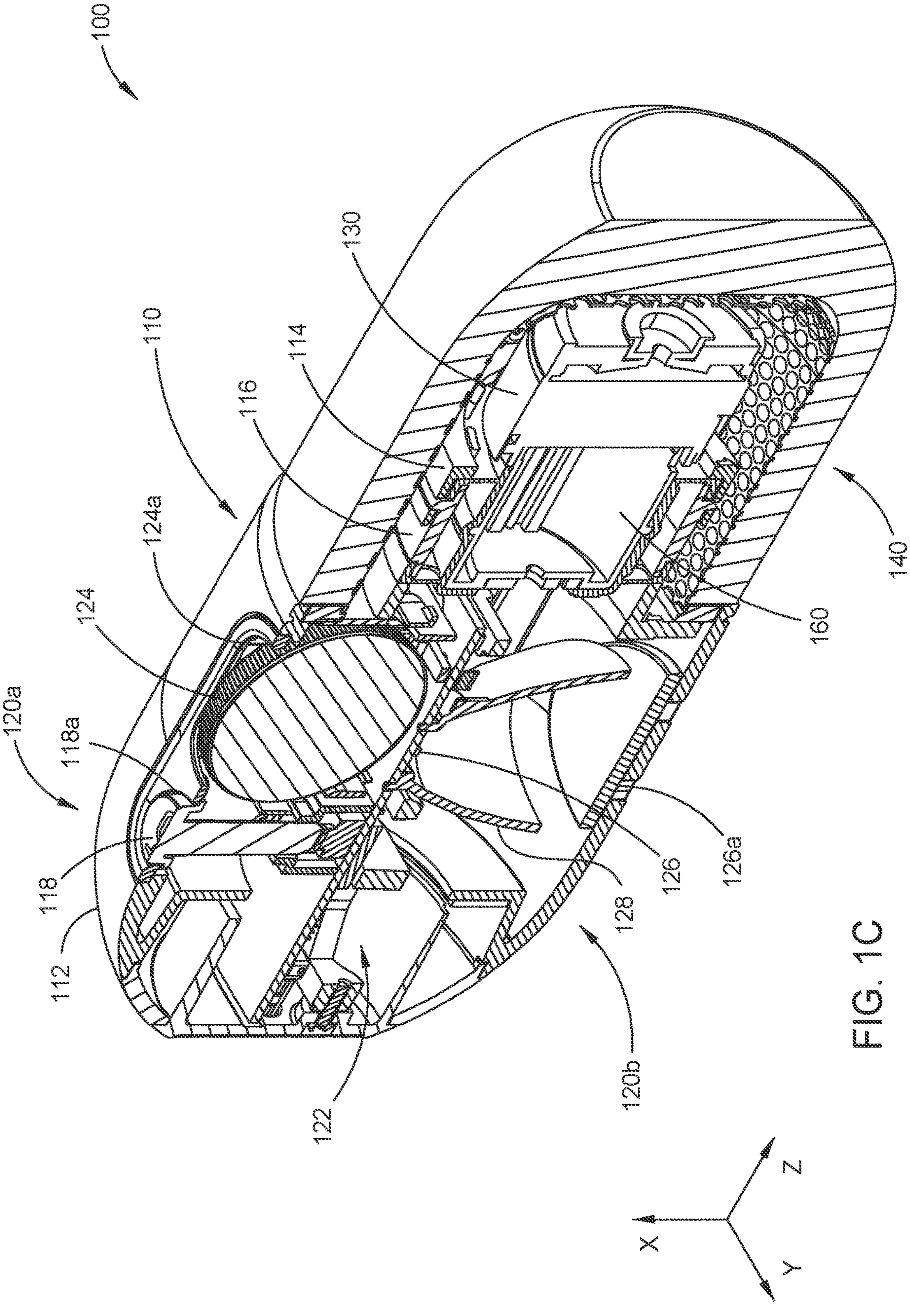
FIG. 1C is a side cross-sectional view of the microphone assembly of FIG. 1A, according to certain embodiments.
Figure 2A:
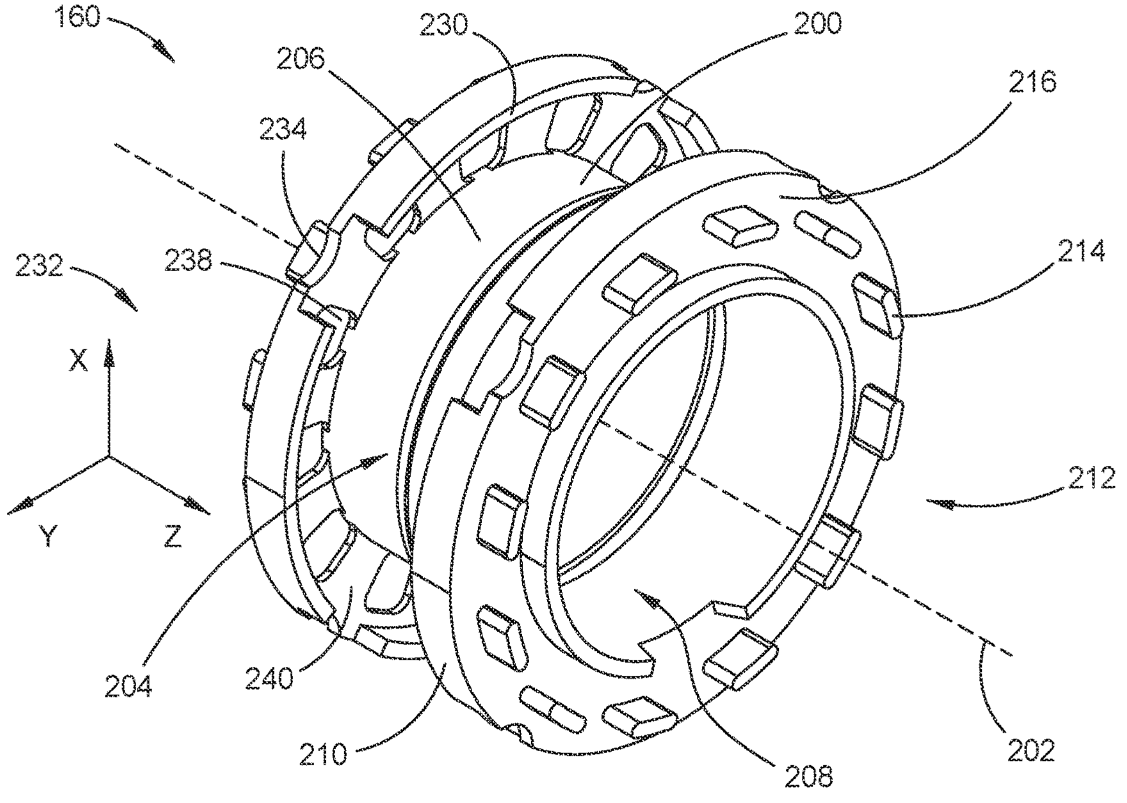
FIG. 2A is a schematic top perspective view of a microphone capsule suspension assembly, according to certain embodiments.
Figure 2B:
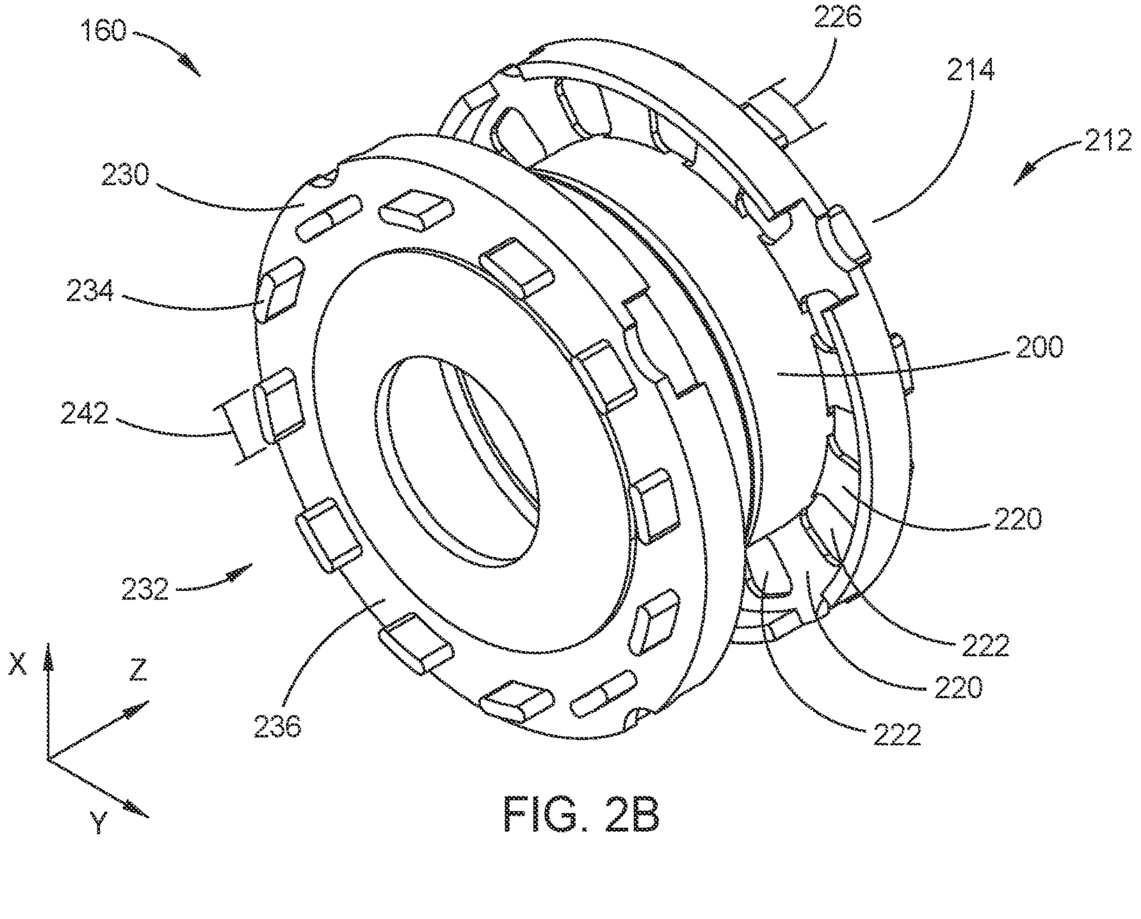
FIG. 2B is a schematic bottom perspective view of the microphone capsule suspension assembly of FIG. 2A, according to certain embodiments.

FIG. 1C is an isometric cross-sectional view of the microphone assembly, and, particularly, the microphone body assembly 110. The housing 112 includes a button aperture 118*a* on a first side 120*a* for a button 118 that is configured to allow the user to adjust various features of the microphone. The button 118 connects to microphone circuitry 122, which is disposed within the housing 112, and protrudes through the button aperture 118*a* of the housing 112. The housing 112 also includes a wheel aperture 124*a* that allows for a scroll wheel 124 to protrude through the housing 112 to allow user interaction. The scroll wheel 124 is also coupled to the microphone circuitry 122 and allows a user to adjust settings of the microphone, such as a volume of the microphone.

The scroll wheel 124 is axially aligned with the microphone capsule suspension assembly 160 such that the direction in which the scroll wheel 124 may scroll or rotate is coaxial to a longitudinal center axis (e.g., central axis 202) of the microphone capsule suspension assembly 160. This configuration allows the microphone capsule suspension assembly 160 to effectively dampen vibrations caused by operation of the scroll wheel 124 during use of the microphone assembly 100.

The housing 112 also includes a light aperture 126*a* on an opposing side 120*b* of the button aperture 118*a* and wheel aperture 124*a*. A light source 126 is disposed within the housing 112 surrounded by a reflector 128. The reflector 128 is configured to direct light emitted from the light source 126 toward the light aperture 126*a*. The reflector 128 may be any suitable reflector 128, such as a conical reflector 128 as shown in FIG. 1C. The light source 126 may be an incandescent light source 126, a light emitting diode, or other desired light source 126. The light source 126 may indicate various states of the microphone to a user. For example, the light source 126 may illuminate when the microphone is in the ON state.

Further, the scroll wheel 124 and the light source 126 may be used together to indicate a status of the microphone assembly 100. For example, the light source 126 may indicate when the scroll wheel 124 reduces a volume of the microphone assembly 100 below a predetermined volume threshold. The scroll wheel 124 may also include additional light sources (not shown) that may indicate a status of the microphone assembly 100. For example, the additional light sources may indicate that the microphone assembly 100 is muted or off.

The microphone capsule suspension assembly 160 separates the housing 112, including the microphone circuitry 122, the scroll wheel 124, and the light source 126, from the dynamic microphone capsule 130. As a user operates the microphone assembly 100, including manipulating the scroll wheel 124 and the light source 126, the user may cause unwanted internal vibrations, e.g., from scrolling the scroll wheel 124, that may interfere with the desired acoustic signal, e.g., by creating noise. The microphone capsule suspension assembly 160 serves to dampen and reduce vibrations caused by operation of the scroll wheel 124 before the unwanted vibrations are detected by the dynamic microphone capsule 130. The microphone capsule suspension assembly 160 also reduces other acoustic vibrations that are received by the back of the housing 112, e.g., vibrations that enter through the cover 140 and would otherwise reflect off the back of the housing 112 and into the dynamic microphone capsule 130, reducing noise.

FIGS. 2A-2D illustrate various views of the microphone capsule suspension assembly 160 of the microphone assembly 100. The microphone capsule suspension assembly 160 includes a body 200 with an upper extension 210 extending outwardly from an upper portion 212 of the suspension and a lower extension 230 extending outwardly from a lower portion 232 of the suspension opposite the upper portion 212. The upper extension 210 and lower extension 230 are coaxial with a central axis 202 of the body 200. In some embodiments, as shown in FIGS. 2A-2D, the body 200 has a cylindrical shape. In some embodiments, the upper extension 210 and lower extension 230 extend the same radial distance from the central axis 202, and have the same cantilever length in the radial direction from the body 200. In some embodiments, the upper extension 210 and the lower extension 230 have a mirror symmetry about a central lateral plane (X-Y plane) that is perpendicular to the central axis 202 (Z-direction). The central lateral plane can be positioned so that it extends through the center 204 (FIG. 2E). The physical mirror symmetry of the upper extension 210 and the lower extension 230 can be useful to prevent unwanted non-symmetric or irregular distortions of the microphone capsule suspension assembly 160 during operation due to vibrations or physical impacts applied to microphone assembly.

In some embodiments, the upper extension 210 has upper protrusions 214 extending upwardly from an outer surface 216 of the upper extension 210. The upper protrusions 214 may be segmented and are disposed along the outer surface 216 of the upper extension 210. The upper protrusions 214 may be arranged in a circular array that is coaxially aligned to the central axis 202 of the body 200. The cross-sectional shape of the upper protrusions 214 may be any suitable shape having a height, width, and thickness. The shape of the upper protrusions 214 in the circular array may be substantially identical or may differ from each other as desired. The number of upper protrusions 214 may be any desired number, such as 24, such as 16, such as 12, such as 6 upper protrusions 214. The upper protrusions 214, in coordination with the upper clamp 114 and lower clamp 116, secure the suspension to the housing 112. In addition, the upper protrusions 214 can act as lateral motion dampers for vibrations traveling through the housing 112, the upper clamp 114, and the lower clamp 116 to the dynamic microphone capsule 130. This configuration allows for a reduction in unwanted noise.

Figure 2C:
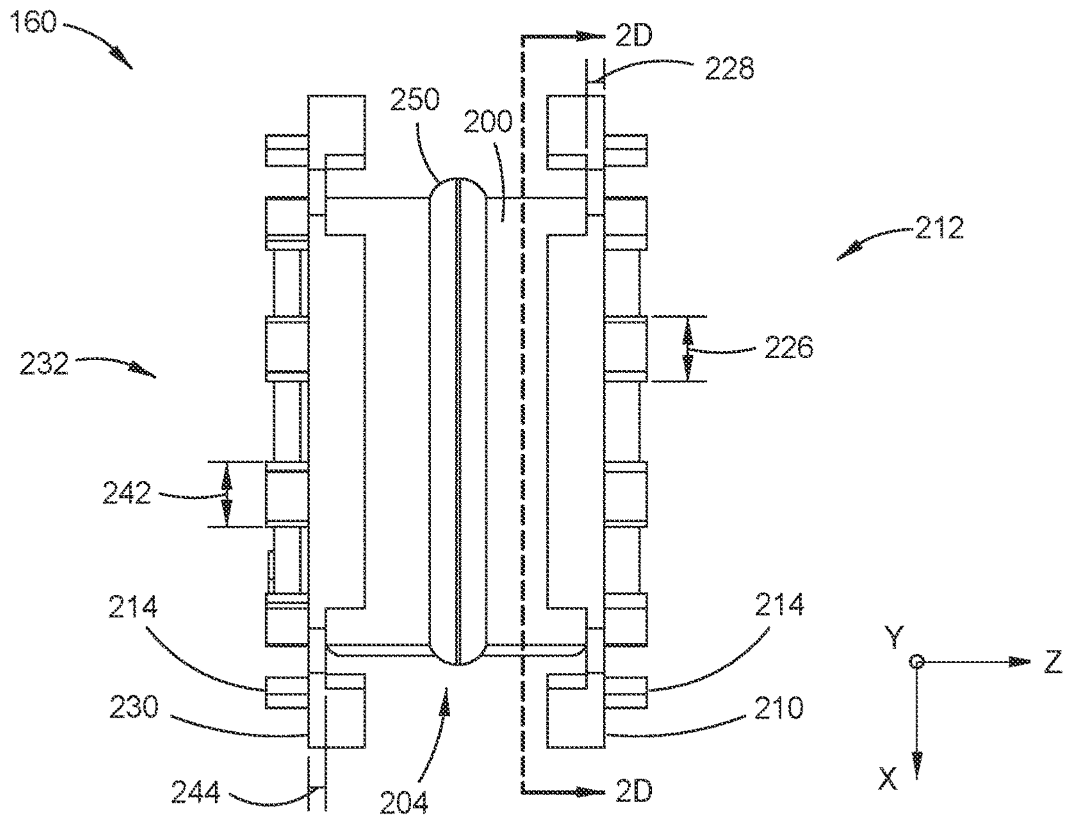
FIG. 2C is a schematic side view of the microphone capsule suspension assembly of FIG. 2A, according to certain embodiments.
Figure 2D:
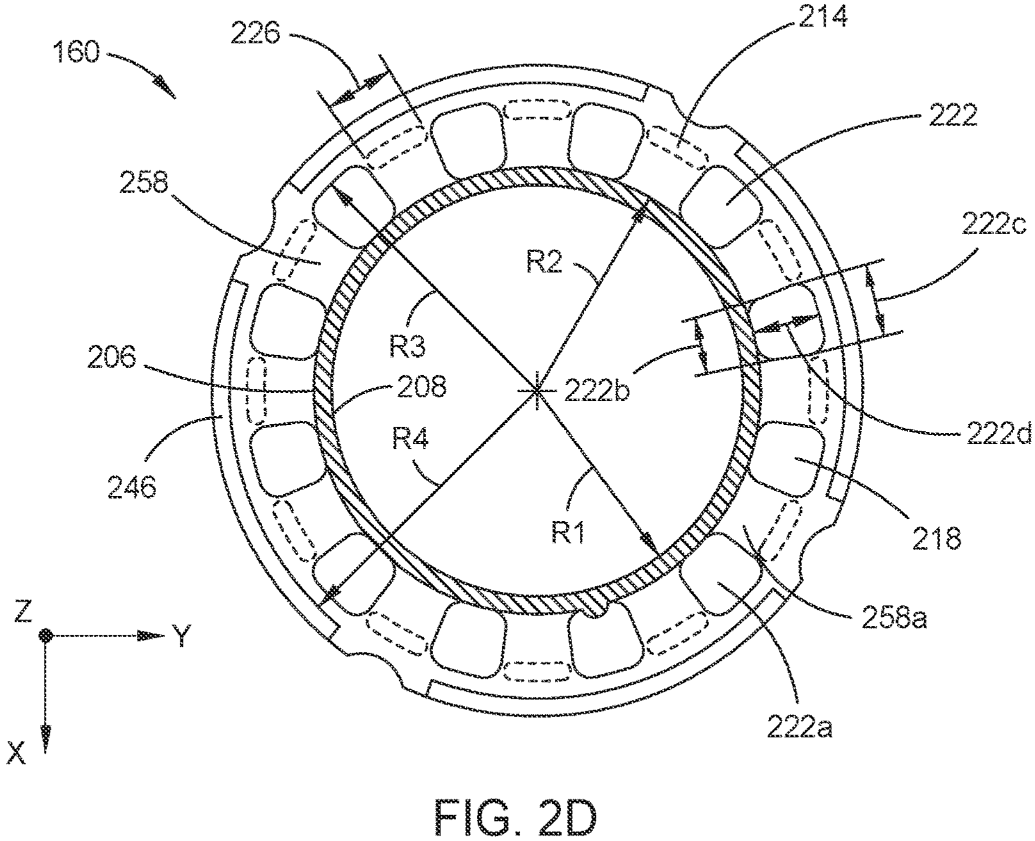
FIG. 2D is a cross-sectional view of the microphone capsule suspension assembly formed by use of sectioning line 2D-2D in FIG. 2C, according to certain embodiments.
Figure 2E:
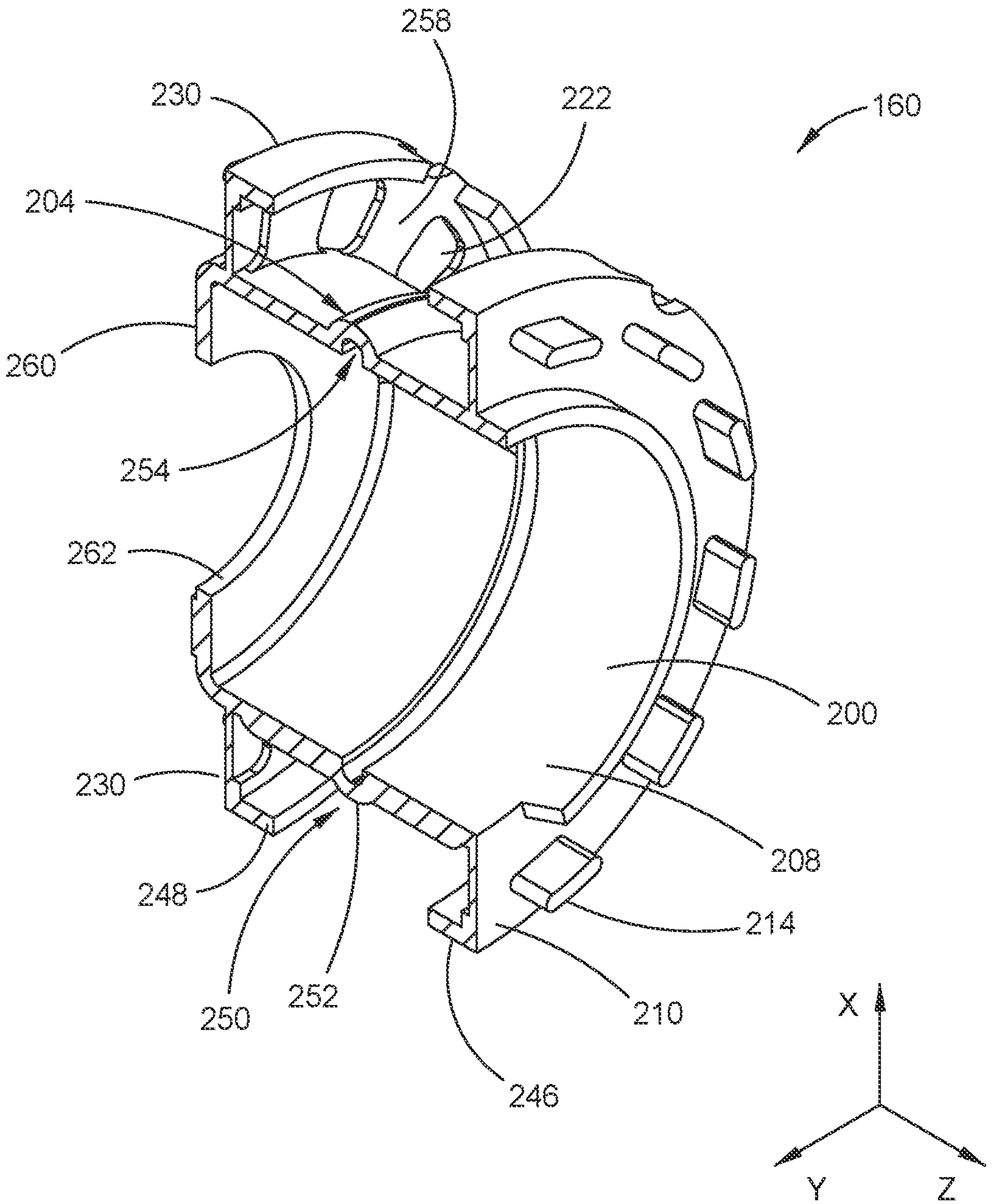
FIG. 2E is a perspective, cross-sectional view of the microphone capsule suspension assembly of FIG. 2A, according to certain embodiments.

FIG. 2D, which is formed by a sectioning line 2D-2D in FIG. 2C, illustrates an inner surface 220 of the upper extension 210, e.g., the surface of the upper extension 210 opposite to an outer surface, which is on the external side 135 of the dynamic microphone capsule 130. As shown in FIG. 2D, the upper extension 210 includes upper indentions 222 radially disposed along the inner surface and coaxial to the central axis 202 of the body 200. The upper indentions 222 are segmented and separated by a plurality of spoke portions 258. In some embodiments, the upper indentions are offset from the upper protrusions 214 formed on the outer surface such that the cross-sectional area of the upper indentions 222 and the upper protrusions 214 do not overlap. The upper indentions 222 may be arranged in a circular array 218 coaxial to the central axis 202 of the body 200 and separated by a distance no less than the width 226 of the upper protrusions 214 such that no overlap between the upper indentions 222 and the upper protrusions 214 occurs. For example, if the width 226 of the upper protrusions 214 is 0.5 millimeters (mm), then the minimum distance between the upper indentions 222 in the array is 0.5 mm.

The lower extension 230 is configured similar to the upper extension 210. The lower extension 230 includes lower protrusions 234 extending from an outer surface 236 of the lower extension 230 and lower indentions 238 in an inner surface 240 opposite the outer surface 236 of the lower extension 230. The lower indentions 238 may be arranged in a circular array coaxial to the central axis 202 of the body 200 with a minimum spacing substantially equal to the width 242 of the lower protrusions 234. The number of lower protrusions 234 may be any desired number, such as 24, such as 16, such as 12, such as 6 lower protrusions 234.

The upper indentions 222 and the lower indentions 238 have a thickness less than a thickness 228 of plurality of spoke portions 258 of the upper extension 210 and the lower extension 230, respectively. The ratio of the thickness of the indentions 222 to the thickness of the spoke portions 258, may be less than 1:2, such as 1:3, such as 1:4, such as 1:5 but greater than 1:10. The indentions and spoke portions within the upper extension 210 and the lower extension 230 form a continuous and non-porous layer of material that extends between the body 200 and an outer extent of the upper extension 210 or the lower extension 230 to prevent airflow in the axial direction therethrough. The ratio of the thickness of the indentions 222 to the thickness of the spoke portions 258 will affect the stiffness (e.g., stiffness k of Equation 1) of the microphone capsule suspension assembly 160, and thus can be adjusted to prevent unwanted resonant frequency induced vibrations. For example, indentions at thickness ratios of 1:1.5 may produce tympanic vibrations within the suspension, producing noise within the dynamic microphone capsule 130, and thus thickness ratios of 1:1.2 and greater are used to avoid this problem.

The upper indentions 222 also includes an upper indention surface area comprising of the total surface area of each of the upper indentions 222 in the circular array 218. Additionally, the plurality of spoke portions 258 includes a spoke surface area comprising the total surface area of each of the plurality of spoke portions 258 disposed between the upper indentions 222 in the circular array 218. The plurality of spoke portions 258 includes a thickness equal to the thickness of the upper extension 210, which is greater than the thickness of the material within each of the upper indentions 222. As such, the overall structural characteristics of the microphone capsule suspension assembly 160 are affected by the ratio of the upper indention surface area **222*a* of the upper indentions 222 to the spoke surface area 258*a* of the plurality of spoke portions 258. The ratio of upper indention surface area 222*a* to spoke surface area 258*a* can be between about 1:2 and 1:5, such as about 1:3. For example, each of the upper indentions 222 are shaped as a trapezoid with a bottom base length 222*b* of about 4.3 mm, a top base length 222*c* of about 3.3 mm, and a height 222*d* of about 3.9 mm producing a surface area of about 169 $mm^2$ and, for 12 upper indentions 222, a total indention surface area (TISA) of 302 $mm^2$. The spoke surface area 258*a* covers the remaining surface area, e.g., about 490 $mm^2$, of the inner surface 220 of the upper extension 210. In one example, the ratio of the upper indention surface area 222*a* to the spoke surface area 258*a* can be defined as a ratio of about 1:2, which can be calculated by dividing the total indention surface area (TISA) of the upper extension 210** by total extension surface area (TESA) minus the total indention surface area (TISA). The total extension surface area (TESA) being equal to $$TESA=\pi(R_4)^2-\pi(R_2)^2; \quad \text{(Equation 2)}$$

where $R_4$ equals the extension outer radius $R_4$ and $R_2$ is the outer surface radius $R_2$, and thus the area ratio being $$\text{Area Ratio}=\frac{TISA}{(TESA-TISA)}. \quad \text{(Equation 3)}$$

It is believed that maintaining surface area ratios for one or more of the materials described herein allows for an improved damping and resonant frequency characteristics while allowing sufficient structural support to the microphone capsule suspension assembly 160. In general, the area ratio of the upper indention surface area 222*a* to spoke surface area 258*a* and the selection of a material used to form the microphone capsule suspension assembly 160, which has desirable mechanical properties is selected to control the structural stiffness to mass ratio of the material structure of the microphone capsule suspension assembly 160.

The lower indentions 238 are configured similarly to the upper indentions 222 and include a lower indention surface area 238*a* separated by a plurality of spoke portions 258. The ratio of lower indention surface area 238*a* to the spoke surface area 258*a* should be between about 1:2 and 1:5, such as about 1:3 and may be equal to the ratio of upper indention surface area 222*a* to the spoke surface area 258*a*. Additionally, as noted above, the lower indentions 238 may aligned with the upper indentions 222 such that the cross-sectional area of each of the lower indentions 238 and the upper indentions 222 overlap along an axis parallel to the central axis 202.

Each of the upper extension 210 and the lower extension 230 include a lip, e.g., upper lip 246 and lower lip 248, extending coaxially to the center axis. The upper lip 246 extends downward and from the inner surface 220 of the upper extension 210. The lower lip 248 extends upward and from the inner surface of the lower extension 230. The upper lip 246 and lower lip 248 are configured to interact with the clamp assembly 170 to secure the microphone capsule suspension assembly 160 to the microphone assembly.

The body 200 may also include an annular ridge 250 disposed along the center 204 of the body 200 and coaxial to the central axis 202. The annular ridge 250 includes a protruding portion 252 on an outer surface 206 of the body 200 and a recessed portion 254 in an inner surface 208 of the body 200. The body 200 includes an outer surface 206 that has an outer radius $R_2$, from which the protruding portion 252 extends. The annular ridge 250 may have the same or different thickness as the body 200. The annular ridge 250 is configured to receive a protrusion 256 of the dynamic microphone capsule 130 to secure the dynamic microphone's position within the body 200.

The inner surface 208 of the body 200 has an inner radius $R_1$ that defines an internal region that is configured to support the dynamic microphone capsule 130. In some embodiments, the body 200 includes an annular base 260 configured to additionally support the dynamic microphone capsule 130 when the dynamic microphone capsule 130 is disposed within the body 200. The annular base 260 is disposed along the lower portion 232 on an inner surface 208 of the body 200 on a side opposing the lower extension 230. The annular base 260 includes a base aperture 262 at its center that is configured to allow access to the dynamic microphone capsule 130 from the internal side 125 of the microphone body assembly 110.

In some embodiments, the microphone capsule suspension assembly 160 may be made of a material having a Shore A hardness of between about 30 and about 40, such as about 35. A hardness in these ranges allows for the microphone capsule suspension assembly 160 to be taught enough to support and secure the dynamic microphone capsule 130 while soft enough to provide effective damping through the body 200. For example, the material may be butyl rubber due to the desirable combination of low stiffness and high damping. However, in some configurations, the material may include a polyurethane or silicone material as these materials are convenient, due to the ease of molding, durability, low stiffness, and low cost. However, there are likely a wide variety of other materials that could be used.

In one embodiment, the material used to form the microphone capsule suspension assembly 200 includes a material that has a tensile modulus (Young's modulus) of between about 1 megapascals (MPa) and about 10 MPa, such as about 2 MPa. In some embodiments, the material used to form the microphone capsule suspension assembly 200 includes a material that has a loss factor $\eta$ of between about 0.5 and about 5. In some embodiments, the material used to form the microphone capsule suspension assembly 200 includes a material that has a glass transition temperature of 20° C. or less, such as less than about 10° C., or less than about −60° C. It has been found that utilizing materials that have the material properties described herein are able to effectively support and dampen the vibrations imparted on the microphone assembly, such that all resonant frequencies were positioned below a 100 Hz, such as less than 80 Hz, or less than 40 Hz. In one example, the material includes butyl rubber.

Figure 1D:
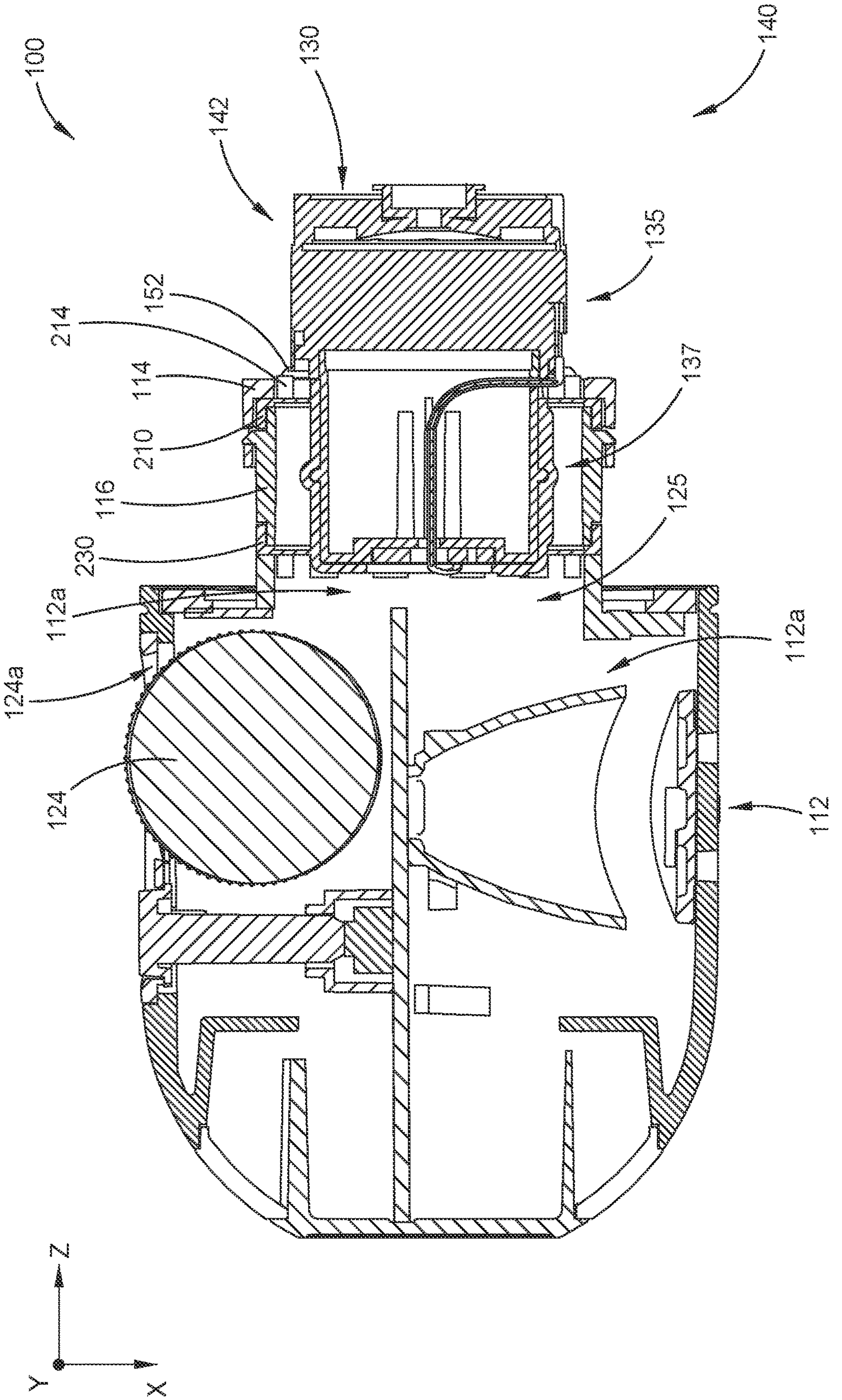
FIG. 1D is a simplified side cross-sectional view of the microphone assembly of FIG. 1C, according to certain embodiments.
Figure 3:
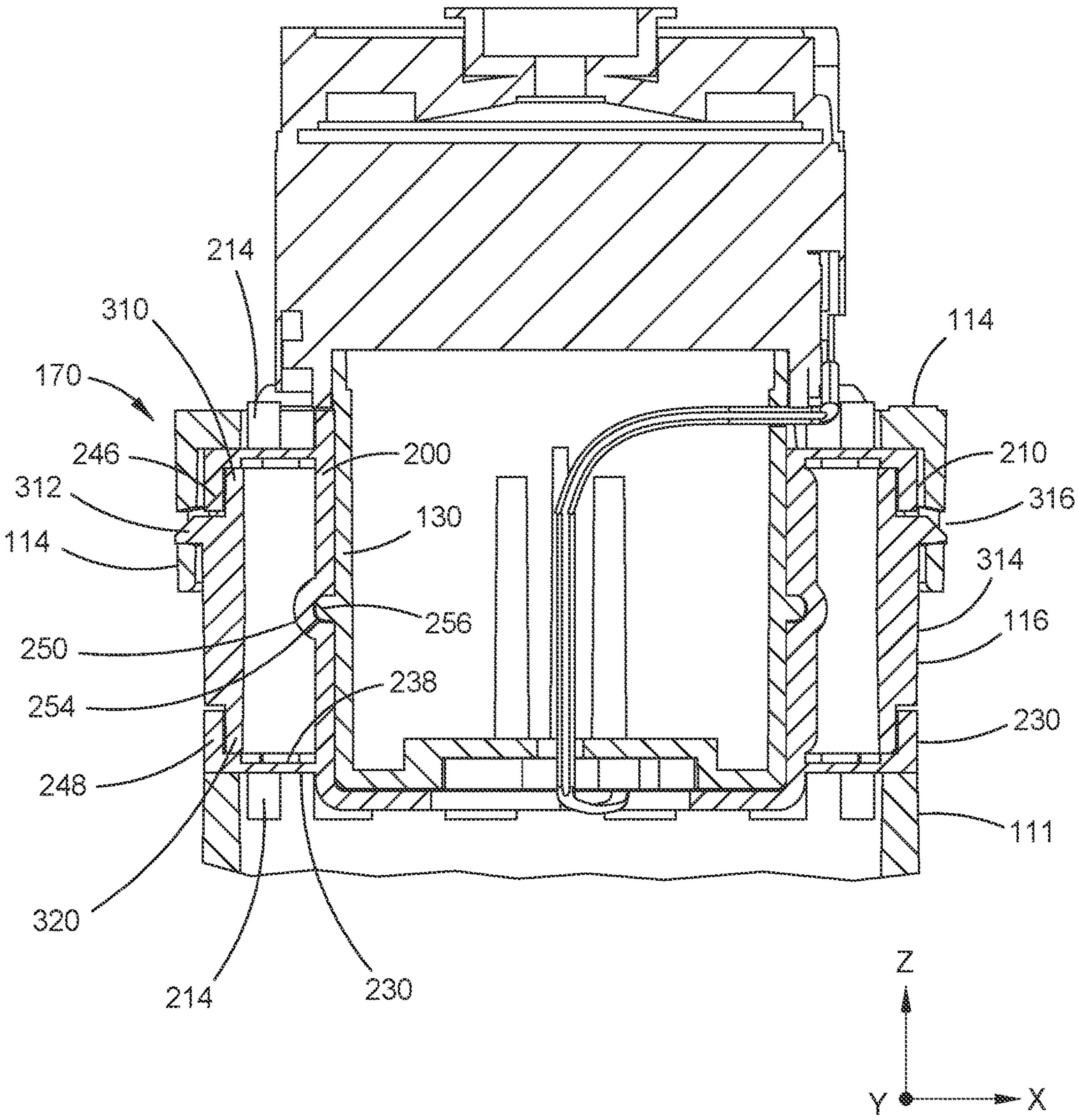
FIG. 3 is a side cross-sectional view of a portion of the microphone assembly, according to certain embodiments.

FIG. 3 illustrates a partial side cross-sectional side view of the microphone assembly 100. As shown in FIG. 3, the dynamic microphone capsule 130 is mounted in and secured to the microphone capsule suspension assembly 160. The microphone capsule suspension assembly 160 is secured to the housing 112 via a clamp assembly 170. The clamp assembly 170 includes the upper clamp 114 and the lower clamp 116 (FIGS. 1C-1D and 3). The microphone capsule suspension assembly 160 rests on the lower clamp 116 and the upper clamp 114 covers both the microphone capsule suspension assembly 160 and upper clamp 114. The upper clamp 114, using a plurality of fasteners 152, secures the microphone capsule suspension assembly 160 to a suspension support 111 (FIGS. 1B and 3) portion of the housing 112. The upper clamp 114, lower clamp 116 and the one or more fasteners 152 are configured to impose a compressive force on portions of the upper extension 210 and lower extension 230 of the microphone capsule suspension assembly 160 such that the upper clamp 114 and lower clamp 116 are urged against a surface of the suspension support 111 of the microphone capsule suspension assembly 160. When a plurality of fasteners 152 (FIG. 1B) are threaded into and tightened to the female threaded fastening portions 154 (FIG. 1B) of the suspension support 111 of the housing 112, the upper clamp 114 and the lower clamp 116 are positioned and configured to simultaneously apply compressive forces to portions of the upper extension 210 and lower extension 230 of the microphone capsule suspension assembly 160 to form an air tight seal that is used to at least partially isolate the external side 135 of the dynamic microphone capsule 130 from the internal side 125 of the dynamic microphone capsule 130. The compressive forces, in some configurations, is also used to form an isolation region 137, which is disposed between the upper extension 210 and lower extension 230 and external side 135 and internal side 125. The internal side 125 of the dynamic microphone capsule 130 generally includes the internal region 112*a* (FIG. 1D) of the microphone body assembly 110 that includes one or more vent ports (not shown) that extend from the internal side 125 of the dynamic microphone capsule 130 to the ambient environment which surrounds the microphone assembly 100 and is on the external side 135, and are used to control and/or restrict the amount air flow from the internal region 112*a* to the ambient environment during the movement of the diaphragm of the dynamic microphone capsule 130 during operation.

As shown in FIG. 3, the internal region 112*a* houses various components, such as the microphone circuitry 122 and the scroll wheel 124. As noted above, once the clamp assembly 170 is engaged, the microphone capsule suspension assembly 160 acts as a physical barrier to and at least partially seals the external side 135 of the dynamic microphone capsule 130 from the internal region 112*a*.

The vibrations received by the dynamic microphone capsule 130 cause oscillations in the diaphragm of the dynamic microphone capsule 130, which are detected by the signal detection components (e.g., diaphragm movement detection components) of the dynamic microphone capsule 130, and thus cause distortion in the sound detected, at one or more frequencies, by the microphone assembly 100. By surrounding the dynamic microphone capsule 130 with the microphone capsule suspension assembly 160 and isolating the dynamic microphone capsule 130 from other components of the microphone, .e.g., the scroll wheel 124, unwanted vibrations are dampened by the suspension before they are processed by the dynamic microphone capsule 130, thus reducing noise.

The lower clamp 116 includes a recessed upper edge 310 configured to receive the upper lip 246 of the upper extension 210 and a recessed lower edge 320 configured to receive the lower lip 248 of the lower extension 230. The lower clamp 116 also include a plurality of angled protrusions 312 extending form an outer surface 314 of the lower clamp 116 adjacent to the recessed upper edge 310. The upper clamp 114 includes a plurality of recesses 316 configured to receive and engage with the plurality of angled protrusions 312.

When engaging the clamp assembly 170, the microphone capsule suspension assembly 160 is coupled to the lower clamp 116 at the recessed upper edge 310 and the recessed lower edge 320. The upper clamp 114 then fits over the suspension and engages the plurality of angled protrusions 312 of the lower clamp 116, such that the angled protrusions slip into the plurality of recesses 316 in the upper clamp 114. Once engaged, the upper clamp 114 imposes a pressure on the suspension and the lower clamp 116 such that the suspension is secured to the upper and lower clamp 116. The annular ring and the fasteners may then be used to secure the clamp assembly 170 to the microphone body assembly 110.

The present disclosure provides a suspension for a dynamic microphone in a microphone assembly that allows for improved dampening of unwanted vibrations, reducing noise in the produced acoustic signal of the microphone. The suspension includes a body with upper protrusions and upper indentions on an upper extension and lower protrusions and lower indentions on a lower extension. The suspension engages with a clamping assembly that serves as the only connection to the microphone housing, effectively isolating the dynamic microphone from all other components of the microphone. In particular, the suspension separates the microphone housing body from the dynamic microphone such that vibrations originating in the housing, including resonant frequencies, are dampened before reaching the dynamic microphone. Isolating the dynamic microphone in this manner prevents undamped mechanical vibration from interfering with the dynamic microphone and producing noise.

When introducing elements of the present disclosure or exemplary aspects or embodiment(s) thereof, the articles "a," "an," "the" and "said" are intended to mean that there are one or more of the elements.

The terms "comprising," "including" and "having" are intended to be inclusive and mean that there may be additional elements other than the listed elements.

The term "coupled" is used herein to refer to the direct or indirect coupling between two objects. For example, if object A physically touches object B and object B touches object C, the objects A and C may still be considered coupled to one another—even if objects A and C do not directly physically touch each other. For instance, a first object may be coupled to a second object even though the first object is never directly in physical contact with the second object.

While the foregoing is directed to embodiments of the present disclosure, other and further embodiments of the disclosure may be devised without departing from the basic scope thereof, and the scope thereof is determined by the claims that follow.

What is claimed is:

1. A microphone capsule suspension assembly, comprising:
- a body comprising:
  - a central portion having an inner surface and an outer surface, wherein the inner surface defines an internal region that is configured to support a microphone capsule;
  - an upper extension extending from an upper portion of the outer surface of the central portion in a radial direction; and
  - a lower extension extending from a lower portion of the outer surface of the central portion in the radial direction, wherein
    - the upper extension and lower extension are spaced apart in a direction that is parallel to a central axis,
    - the upper extension and the lower extension each comprise a continuous wall that has a first wall thickness and comprises an array of indentions formed therein that have a second wall thickness,
    - the first wall thickness is greater than the second wall thickness, and
    - the upper extension and the lower extension comprise a continuous and non-porous layer of material that prevents airflow in an axial direction therethrough.

2. The microphone capsule suspension assembly of claim 1, wherein a plurality of upper protrusions extend from an outer surface of the upper extension and are aligned in a circular array coaxial to a center axis of the body.

3. The microphone capsule suspension assembly of claim 2, wherein a plurality of lower protrusions extend from an outer surface of the lower extension and are aligned in a circular array coaxial to the center axis of the body.

4. The microphone capsule suspension assembly of claim 3, wherein the plurality of upper protrusions are offset from the plurality of upper indentions and the plurality of lower protrusions are offset from the plurality of lower indentions.

5. The microphone capsule suspension assembly of claim 1, wherein the array of indentions are segmented and radially disposed along the inner surface of the upper extension and comprise a thickness less than a thickness of the upper extension.

6. The microphone capsule suspension assembly of claim 1, wherein the body comprises a material with a Shore A hardness of between about 30 and about 40.

7. The microphone capsule suspension assembly of claim 1, the upper extension and lower extension each further comprising a plurality of spokes having the first wall thickness between the array of indentions and wherein a ratio of a surface area of the indentions in each of the upper and lower extensions to a surface area of the spokes is 2:1 or less.

8. A microphone assembly, comprising:
- a microphone body assembly;
- a microphone capsule suspension assembly configured to be coupled to the microphone body assembly by a clamp assembly, the microphone capsule suspension assembly comprising:
  - a body comprising:
    - a central portion having an inner surface and an outer surface, wherein the inner surface defines an internal region that is configured to support a microphone capsule;
    - an upper extension extending from an upper portion of the outer surface of the central portion in a radial direction; and
    - a lower extension extending from a lower portion of the outer surface of the central portion in the radial direction, wherein
      - the upper extension and the lower extension are spaced apart in a direction that is parallel to a central axis,
      - the upper extension and the lower extension each comprise a continuous wall that has a first wall thickness and comprises an array of indentions formed therein that have a second wall thickness
      - the first wall thickness is greater than the second wall thickness, and
      - the upper extension and the lower extension comprise a continuous and non-porous layer of material that prevents airflow in an axial direction therethrough; and
    - a dynamic microphone capsule disposed within the internal region of the body.

9. The microphone assembly of claim 8, wherein the microphone capsule suspension assembly is coupled to the microphone body assembly using an upper clamp and a lower clamp of the clamp assembly.

10. The microphone assembly of claim 9, wherein the lower clamp comprises a recessed upper edge and recessed lower edge, the microphone capsule suspension assembly coupled to the recessed upper edge and the recessed lower edge.

11. The microphone assembly of claim 10, wherein the upper clamp is configured to fit over the microphone capsule suspension assembly and engage with a plurality of angled protrusions of the lower clamp to secure the microphone capsule suspension assembly to the upper clamp and the lower clamp.

12. The microphone assembly of claim 8, wherein the microphone capsule suspension assembly acoustically separates a housing of the microphone body assembly from the dynamic microphone.

13. The microphone assembly of claim 8, wherein the microphone body assembly comprises a scroll wheel protruding through a wheel aperture of a housing of the microphone body assembly, the scroll wheel being acoustically separated from the dynamic microphone capsule by the microphone capsule suspension assembly.

14. A microphone body assembly, comprising:
- a housing;
- a wheel aperture formed on a first side of the housing;
- a scroll wheel protruding through the wheel aperture;
- a microphone capsule suspension assembly positioned on the housing and disposed between the scroll wheel and a dynamic microphone capsule, the microphone capsule suspension assembly comprising:
  - a central portion having an inner surface and an outer surface, wherein the inner surface defines an internal region that is configured to support a microphone capsule;
  - an upper extension extending from an upper portion of the outer surface of the central portion in a radial direction; and
  - a lower extension extending from a lower portion of the outer surface of the central portion in the radial direction, wherein
    - the upper extension and lower extension are spaced apart in a direction that is parallel to a central axis,
    - the upper extension and the lower extension each comprise a continuous wall that has a first wall thickness and comprises an array of indentions formed therein that have a second wall thickness, and
    - the first wall thickness is greater than the second wall thickness, and
    - the upper extension and the lower extension comprise a continuous and non-porous layer of material that prevents airflow in an axial direction therethrough; and
  - a clamp assembly configured to secure the microphone capsule suspension assembly to the housing.

15. The microphone body assembly of claim 14, wherein the clamp assembly comprises an upper clamp and a lower clamp.

16. The microphone body assembly of claim 15, wherein the lower clamp comprises a recessed upper edge configured to receive an upper lip of the microphone capsule suspension assembly and a recessed lower edge configured to receive a lower lip of the microphone capsule suspension assembly.

17. The microphone body assembly of claim 16, wherein the upper clamp is configured to fit over the microphone capsule suspension assembly and engage with the lower clamp.

18. The microphone body assembly of claim 15, wherein the upper clamp comprises a plurality of recesses configured to engage with a plurality of angled protrusions of the lower clamp.

19. The microphone body assembly of claim 15, wherein the scroll wheel is aligned with the microphone capsule suspension assembly such that the direction the scroll wheel rotates is coaxial to a longitudinal center axis of the microphone capsule suspension assembly.

20. The microphone body assembly of claim 1, wherein a first surface of the wall of the lower extension is configured to form a seal with a portion of a suspension supporting element of the microphone capsule suspension assembly.

21. The microphone body assembly of claim 20, wherein the array of indentions formed within the lower extension are formed on a second surface of the wall, which is opposite to the first surface.

* * * * *